United States Patent [19]

Madden et al.

[11] Patent Number: 4,777,086

[45] Date of Patent: Oct. 11, 1988

[54] LOW DENSITY INSULATION PRODUCT

[75] Inventors: Martin J. Madden, Cincinnati, Ohio; Mark A. Lang, Mission Viejo, Calif.

[73] Assignee: Owens-Corning Fiberglas Corporation, Toledo, Ohio

[21] Appl. No.: 112,358

[22] Filed: Oct. 26, 1987

[51] Int. Cl.$^4$ .......................................... B32B 15/00
[52] U.S. Cl. ................... 428/285; 428/282; 428/284; 428/297; 428/298; 428/903; 428/920; 428/432; 428/457
[58] Field of Search ............... 428/285, 284, 297, 298, 428/903, 920, 432, 457, 282

[56] References Cited

U.S. PATENT DOCUMENTS

| | | | |
|---|---|---|---|
| 2,172,048 | 9/1939 | Johnson | 20/4 |
| 3,007,596 | 11/1961 | Matsch | 220/9 |
| 3,009,600 | 11/1961 | Matsch | 220/9 |
| 3,009,601 | 11/1961 | Matsch | 220/9 |
| 3,647,606 | 3/1972 | Notaro | 161/52 |
| 3,769,770 | 11/1973 | Deschamps et al. | 52/404 |
| 4,278,721 | 7/1981 | Hudgin | 428/122 |
| 4,323,620 | 4/1982 | Iwabuchi et al. | 428/215 |
| 4,395,455 | 7/1983 | Frankosky | 428/285 |
| 4,486,997 | 12/1984 | Roy | 52/404 |
| 4,500,592 | 2/1985 | Lee et al. | 428/251 |
| 4,525,406 | 6/1985 | Pollock | 428/137 |
| 4,700,521 | 10/1987 | Cover | 52/404 |

OTHER PUBLICATIONS

Fiberglas Aircraft Insulation PF-105W Series (Owens-Corning Fiberglas brochure).
Heat Transfer by Conduction and Radiation in Absorbing and Scattering Materials, by R. Viskanta (Journal of Heat Transfer, Feb. 1965, pp. 143-150).
Analysis of Heat Transfer in Building Thermal Insulation, by H. A. Fine, et al. (Oak Ridge National Laboratory, Contract No. W-7405-eng-26, published Dec. 1980).

Primary Examiner—James J. Bell
Attorney, Agent, or Firm—Patrick P. Pacella; Ted C. Gillespie

[57] ABSTRACT

An insulation product comprises the first and second film of reflective material and one or more layers of insulating material positioned between the outer films, the films having an emissivity less than about 0.2 and the insulating material having a density within the range of from about 0.01 to about 0.3 pcf.

20 Claims, 4 Drawing Sheets

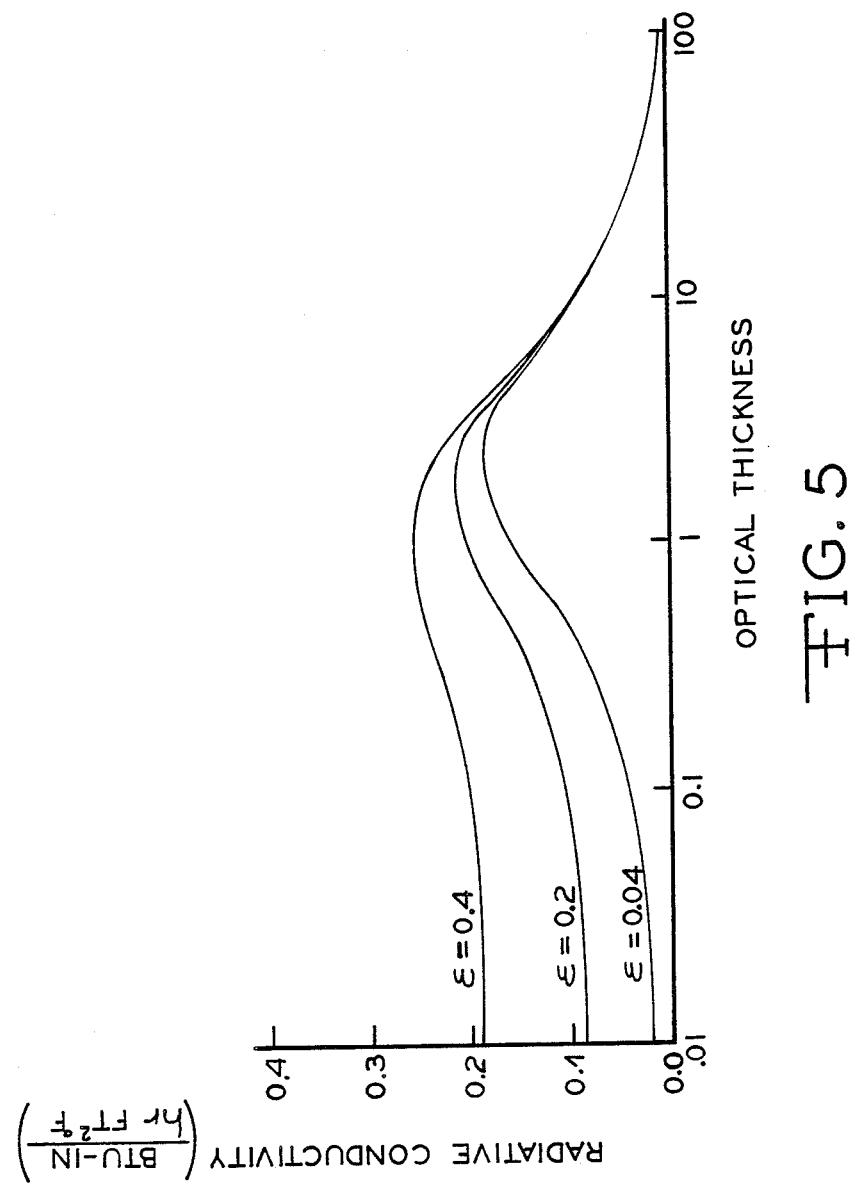

4,777,086

LOW DENSITY INSULATION PRODUCT

TECHNICAL FIELD

This invention relates to insulation products. In particular, this invention relates to insulation products suitable for use for building insulation and the like. More particularly, the invention relates to low density insulation products having two or more films of reflective material and insulating material, such as a fibrous glass mat, positioned between the films.

BACKGROUND OF THE INVENTION

Insulation systems with multiple layers of reflective surfaces or films, such as foils and fibrous insulation between the reflective surfaces are known in the art. The use of low emissivity films on the boundaries of an insulation product reduces the thermal conductivity due to radiation. Typically, insulation products of the prior art using reflective films require vacuums. The vacuum requirement gives the insulation product inherent physical limitations, and such a product is unsuitable for use as a basic building material. The loss of the vacuum during transportation, installation and use is high.

Typical building insulation having a density of about 0.6 pounds per cubic foot (pcf) has enough fiber surfaces within the product to constitute a good pathway for absorbing radiative heat transfer. Therefore, typical insulation products of fibrous glass and the like have a significant heat transfer by radiation ($k_{rad}$). Typically, the $k_{rad}$ for 0.6 pcf building insulation product of fibrous glass is on the order of about 0.13 BTU-in./hr Ft$^2$°F. A reduction in the density of the insulation product is advantageous in that it reduces freight costs and is potentially easier to install. Further, density reductions will result in lower manufacturing costs due to reduced use of raw materials and energy for the same insulating value.

There is a need for an insulation product which uses low density materials and also makes use of the low radiation heat transfer characteristics of low emissivity surfaces. Such an insulation product would have a high insulation value per unit weight.

SUMMARY OF THE INVENTION

A solution to the above problem has been developed in which an insulation product has outer films of reflective material having a low emissivity, and has insulating material positioned between the films, where the insulating material has a density lower than about 0.3 pcf. It has been found that an insulation product having insulating material of such low density, when coupled with outer boundaries of low emissivity material, reduces the radiative heat transfer to a surprising degree.

According to this invention, there is provided an insulation product comprising first and second films of reflective material, and one or more layers of insulating material positioned between the outer films, where the films have an emissivity less than about 0.2, and the insulating material has a density within the range from about 0.01 to about 0.3 pcf.

In a specific embodiment of the invention the insulation material has a density within the range of from about 0.025 to about 0.25 pcf.

In another specific embodiment of the invention, the insulation material is a fibrous material, which preferably is glass fibers.

In a preferred embodiment of the invention, the insulating material is a fibrous mat with the average fiber diameter being within the range of from about 5 microns to about 37 microns.

In another specific embodiment of the invention, two or more layers of insulating material are positioned between the outer films, each layer of insulating material being separated by adjacent layers of insulating material by inner films of reflective material, the inner films having an emissivity less than about 0.2.

According to this invention, there is also provided an insulation product comprising first and second films of reflective material, and one or more layers of insulating material positioned between the outer films, the films having an emissivity of less than about 0.2, and the insulating material having an optical thickness of less than about 1, where the optical thickness is defined by the equation $$\text{optical thickness} = \rho l \bar{k}$$

where $\rho$ is the density of the product (pcf), $l$ is the thickness of the product (inches) and $\bar{k}$ is the extinction coefficient of the insulation material.

In a specific embodiment of the invention, the optical thickness is within the range of from about 0.01 to about 1.0.

In a preferred embodiment of the invention, the density of the insulating material is within the range of from about 0.025 to about 0.25 pcf.

In yet another embodiment of the invention, the insulation product is combined with an additional layer of insulating material having a density within the range of from about 0.2 pcf to about 5.0 pcf. Preferably, the additional layer of insulating material has an NRC rating within the range of from about 0.3 to about 0.8, in order to provide a combined or laminated insulation product having both high sound absorption characteristics, and light weight and high R value. Such a combined product would be extremely useful for insulating aircraft.

DESCRIPTION OF THE DRAWINGS

FIG. 5 is a graph illustrating the relationship between $k_{rad}$ and the optical thickness of the insulating material.

DESCRIPTION OF THE INVENTION

Figure 1:
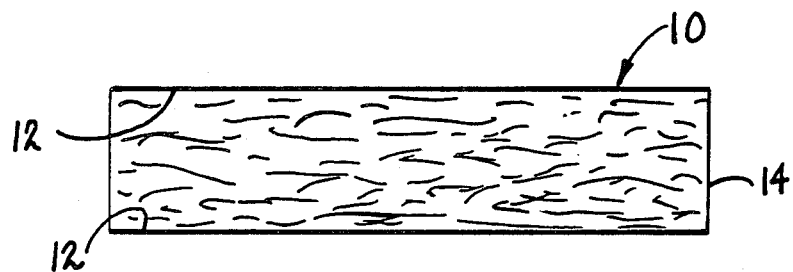
FIG. 1 is a schematic sectional view in elevation of an insulation product according the invention.

As shown in FIG. 1, insulation product 10 is bounded on both sides by reflective films 12. Intermediate the reflective films is a layer of insulating material, such as glass fiber mat 14. The reflective films can be any film suitable for slowing down radiative heat transfer. Examples include low emissivity aluminum foil and metalized films, such as Mylar. The films are preferably light weight, but resistant to tearing. The films should have an emissivity less than about 0.2, and preferably an emissivity less than 0.1.

The insulating material can be any insulating material having a density within the range of from about 0.01 to about 0.3 pcf. The insulating material is preferably a fibrous material, and the fibers should be sufficient to substantially eliminate air currents within the insulation product. Fiber diameters suitable for use in the invention, when a glass fiber mat is used, are preferably within the range of from about 5 microns to about 37 microns.

Figure 2:
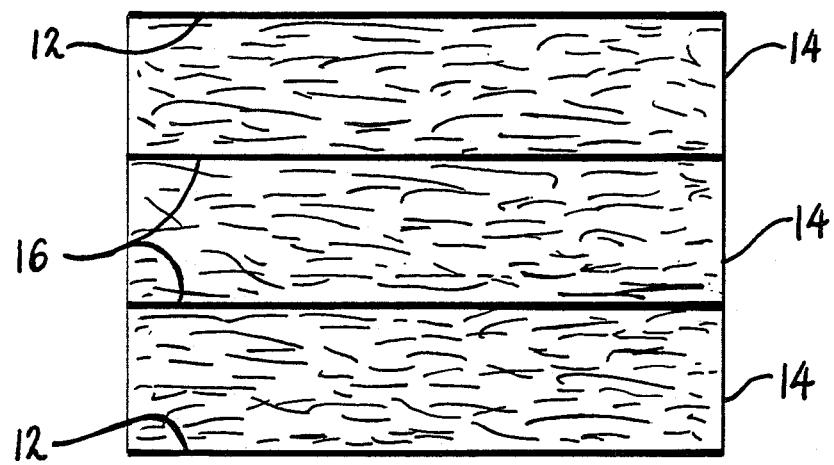
FIG. 2 is a schematic sectional view in elevation of another embodiment of the invention, including two inner low emissivity reflective films.

As shown in FIG. 2, the insulation product of the invention can contain two or more inner films 16 positioned between the outer films 12. Mats 14 comprise the layers of insulating material positioned between the films. The inner films must have reflective surface on both sides, whereas the outer films only need the reflective surface on the side facing the product. Any number of films and layers of insulating material can be used in the invention.

Figure 3:
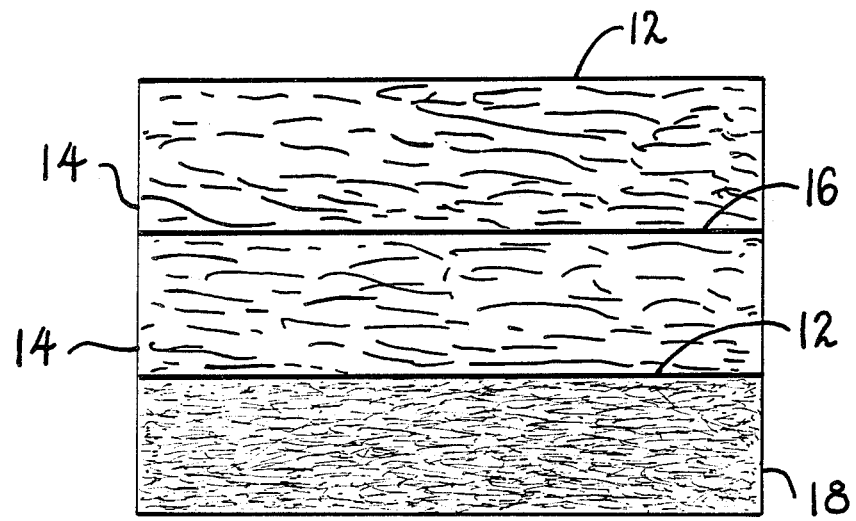
FIG. 3 is a schematic sectional view in elevation of yet another insulation product according to the invention, where the low density insulation material is combined with insulation material of higher density.

As shown in FIG. 3, the insulation product can comprise low density insulation in combination with a layer of conventional insulation. This composite insulation product is made from inner film 16 of reflective material and outer films 12 of reflective material. The films are spaced apart by layers of low density insulating material such as glass fibrous mats 14. The final layer is a layer of conventional insulation material having a greater density than the insulating material in the other layers. For example, the heavier density material could be glass fiber blanket 18 having a density within the range of from about 0.2 pcf to about 5.0 pcf.

The product of the invention combining both low density and higher density insulating material is useful for numerous applications, including in particular, use as insulating material for aircraft. For such a use, it would be advantageous for the heavier density layer to have a high sound absorbing capability. Preferably, the additional layer of insulating material has an NRC rating within the range of from about 0.3 to about 0.8. The combined insulation product would then include both the light weight, low cost insulating characteristics of the low density insulation with the benefits of an insulation material having high noise absorption.

Figure 4:
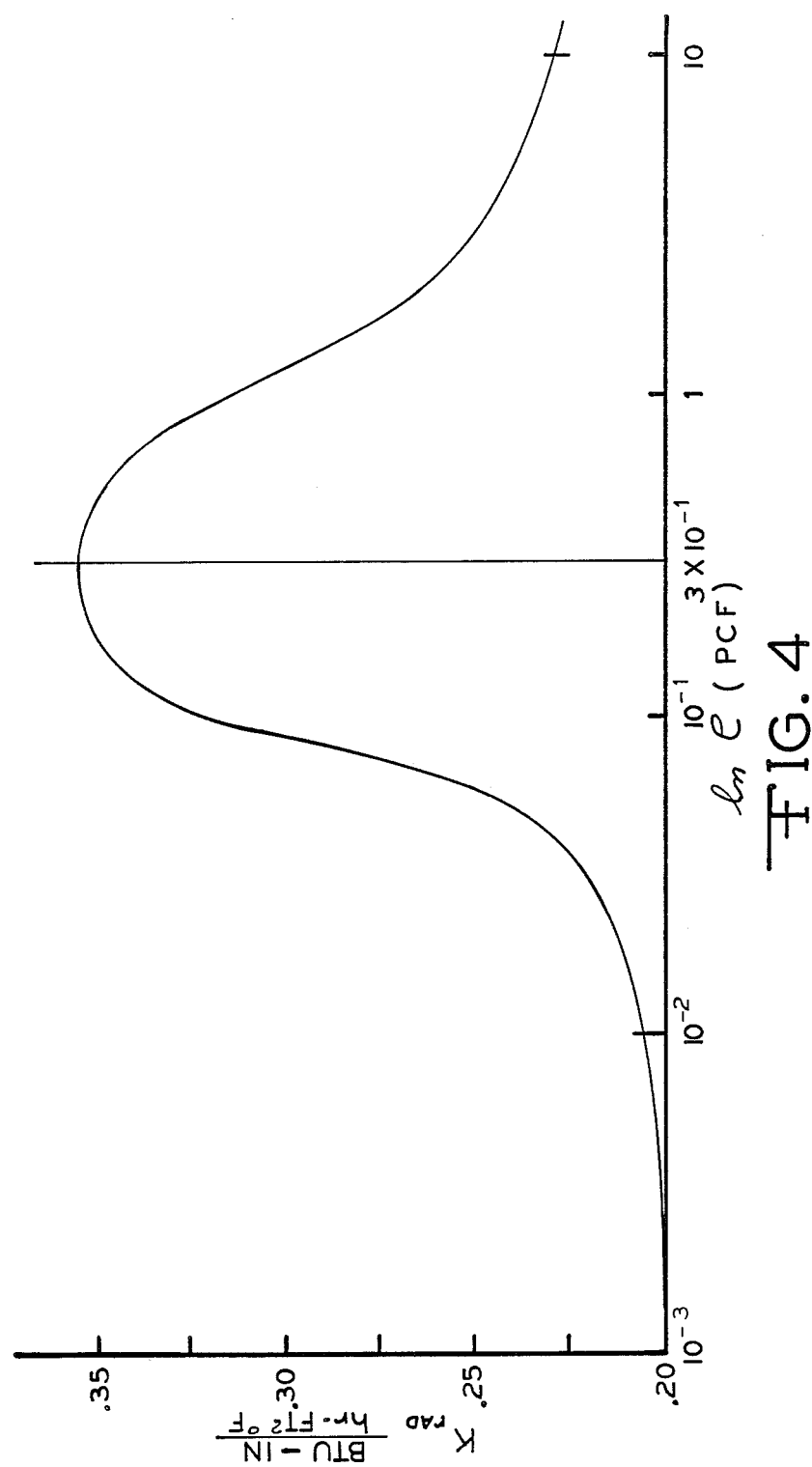
FIG. 4 is a graph illustrating the relationship between $k_{rad}$ and the density of the insulating material.

As shown in FIG. 4, the graph of the radiation component of the heat transfer $k_{rad}$ as a function of the density exhibits a spike or bell curve centered on a density of about 0.3 pcf. Traditional insulating materials are exclusively on the right-hand side of this curve and have densities greater than 0.3 pcf. To obtain $k_{rad}$ one measures the k value on a guarded hot plate on tests that are well known to those skilled in the art. The k value for air (0.183 btu-in/hr Ft²°F.) must be subtracted from the measured value. Preferably, $k_{rad}$ is within the range of from about 0.01 to about 0.3. It is known in the art that fiber to fiber solid conduction in the density ranges discussed is small enough that it can be assumed to be zero. For example, typical glass fiber building insulation has a density of about 0.6 or 0.7 pcf. It can be seen that the insulation product made according to the invention, having a density below 0.3 pcf, has a $k_{rad}$ which diminishes as the density is reduced.

As shown in FIG. 5, the $k_{rad}$ for an insulation product of low emissivity boundary films is reduced where the optical thickness of the product is lower than about 1. The insulating material for the product was 100 Ht glass fibers made from C-glass. Traditional building insulation materials, such as fiber glass building insulation have optical thicknesses greater than about 2. The optical thickness of the insulation products made according to the invention are less than about 1.0, and preferably lower than about 0.6. The optical thickness is defined by the equation $$\text{optical thickness} = \rho l \bar{k}$$

where $\rho$ is the density of the product (pcf), l is the thickness of the product (in) and $\bar{k}$ is the extinction coefficient of the insulation material. The extinction coefficient is the measure of the ability of a given path length or thickness of insulating material to attenuate thermal radiation energy, and is a function of both the fiber diameter and the type of material. It can be expressed as the following ratio:

$$k = \frac{\text{rate of decrease of radiation energy per unit distance}}{\text{intensity of radiation}}$$

and is further discussed in *Absorption and Scattering of Light by Small Particles* by Craig F. Bohren et al., John Wiley and Sons, which is hereby incorporated by reference. The extinction coefficient used should be the energy weighted average to take into account the effect of different energy values for different radiant energy wavelengths.

An example of a measurement of optical thickness is as follows: compare Product A, which is a 0.62 pcf, 3½", R-11 glass fiber insulation product made from 25 Ht glass fibers with Product B, which is a similar product made of finer fibers, Product B having the same density (0.62 pcf), and being a 3½", thick R-12 product made from 15 Ht glass fibers. The optical thickness of the 15 Ht product (Product B) is greater than the optical thickness of the 25 Ht product (Product A) even though they have the same density.

It has been found that an insulation product using insulation material having a density of less than about 0.3 pcf is advantageous. Specifically, in fibrous insulation products, only a relatively small number of fibers are necessary to inhibit natural convection. In a product of low emissivity boundaries the greater number of fibers of a finer diameter act to set up radiant energy short circuits in such low density products. Therefore, fat fibers, such as 100 Ht thickness fibers, and fewer of them, are better than finer fibers, such as 10 Ht thickness fibers.

EXAMPLE 1

An insulation product was made according to the principles of the invention. The product was made from two reflective films which were aluminum foil and a mat of 100 Ht glass fibers made from C-glass. The samples produced were all one inch thick, and each successive sample was made a different density by stuffing more of the glass fibers into the product. Each sample was made in a frame which was 16"×16"×1". The densities chosen and the resulting total k were given as shown in Table 1.

TABLE 1

| Density (pcf) | Total k (btu in./hr Ft² °F.) |
|---|---|
| 0.0 | .200 |
| .025 | .215 |
| .05 | .242 |
| .10 | .330 |
| .20 | .347 |

TABLE 1-continued

| Density (pcf) | Total k (btu in./hr Ft² °F.) |
|---|---|
| .4 | .353 |
| .70 | .339 |
| 1.00 | .317 |

This data, when plotted on a log graph, is similar to that shown in FIG. 4. It is estimated that the surface emissivity of the aluminum foil is approximately 0.04.

EXAMPLE 2

An insulation product according to the principles of the invention was made from polypropylene fibers. The polypropylene was 1.5 dpf polypropylene obtained from Hercules Corporation. The product was made using a reflective film having an emissivity of 0.04. The mat of polyproplyene fibers had a thickness of 1 inch. Products were made at different densities ranging from 0.04 pcf to 1.0 pcf. The results, shown in Table 2, were similar to the results in the samples of Example 1. As the density increased from 0.04 to 0.55 the $k_{rad}$ value increased from 0.021 to 1.01. The k values were tested on a Sparrell tester which measures the vertical heat flow down and avoids the currents of natural convection.

TABLE 2

| Density (pcf) | $k_{rad}$ (btu-in/hr Ft² °F.) | Optical Thickness |
|---|---|---|
| .04 | .021 | .52 |
| .16 | .078 | 2.08 |
| .28 | .101 | 3.64 |
| .55 | .100 | 7.15 |
| 1.00 | .086 | 13.0 |

The data of Example 2 indicate that fibers of different materials will give different heat transfer characteristics. The polypropylene fibers gave lower heat transfer than the glass fibers. The extinction coefficient for the material of Example 2 is 13. The optical thickness values shown in Table 2, which coorelate with the curve (emissivity=0.04) of FIG. 5, show that $k_{rad}$ increases with decreasing optical thickness up to a point (approximately optical thickness=2) and decreases with decreasing optical thickness for optical thickness values less than about 2.

It will be evident from the foregoing that various modifications can be made to this invention. Such, however, are considered as being within the scope of the invention.

INDUSTRIAL APPLICABILITY

This invention will be found to be useful for thermal and acoustical insulation products.

We claim:

1. An insulation product comprising first and second films of reflective material, and one or more layers of insulating material positioned between the outer films, the films having an emissivity less than about 0.2, and the insulating material having a density within the range of from about 0.01 to about 0.3 pcf.

2. The insulation product of claim 1 in which the insulation material has a density within the range of from about 0.025 to about 0.25 pcf.

3. The insulation product of claim 1 in which the insulation material is a fibrous material.

4. The insulation product of claim 3 in which the insulation material comprises glass fibers.

5. The insulation product of claim 3 in which the insulating material is a fibrous mat, with the average fiber diameter being within the range of from about 5 microns to about 37 microns.

6. The insulation product of claim 1 comprising two or more layers of insulating material positioned between the outer films, and one or more inner films of reflective material positioned between the outer films and spaced apart from the outer films by the insulating material, both surfaces of the inner film having an emissivity less than about 0.2.

7. An insulation product comprising first and second films of reflective material, and one or more layers of insulating material positioned between the outer films, the films having an emissivity less than about 0.2, and the insulating material having an optical thickness less than about 1, the optical thickness being defined by the equation $$\text{optical thickness} = \rho l \overline{k}$$

where, $\rho$ is the density of the product (pcf), $l$ is the thickness of the product (in) and $\overline{k}$ is the extinction coefficient of the insulating material.

8. The insulation product of claim 7 in which the optical thickness is within the range of from about 0.01 to about 1.0.

9. The insulation product of claim 8 in which the insulating material is a fibrous material.

10. The insulation product of claim 9 in which the insulating material comprises glass fibers.

11. The insulation product of claim 9 in which the insulating material is a fibrous mat, with the average fiber diameter being within the range of from about 5 microns to about 37 microns.

12. The insulation product of claim 7 comprising two or more layers of insulating material positioned between the outer films, and one or more inner films of reflective material positioned between the outer films and spaced apart from the outer films by the insulating material, the inner film having an emissivity less than about 0.2.

13. An insulation product comprising first and second outer films of reflective material, two or more layers of insulating material positioned between the outer films, and one or more inner films of reflective material positioned between the outer films and spaced apart from the outer films by the insulating material, the inner and outer films having an emissivity less than about 0.2, and the insulating material having a density within the range of from about 0.01 to about 0.3 pcf.

14. The insulation product of claim 13 in which the insulating material has a density within the range of from about 0.025 to about 0.25 pcf.

15. The insulation product of claim 14 in which the insulating material is a fibrous material.

16. The insulation product of claim 15 in which the insulating material comprises glass fibers.

17. The insulation product of claim 15 in which the insulating material is a fibrous mat, with the average fiber diameter being within the range of from about 5 microns to about 37 microns.

18. The insulation product of claim 15 in which the optical thickness less than about 1, the optical thickness being defined by the equation $$\text{optical thickness} = \rho l \overline{k}$$

where, $\rho$ is the density of the product (pcf), 1 is the thickness of the product (in) and $\bar{k}$ is the extinction coefficient of the insulating material.

19. The insulation product of claim 13 in combination with an additional layer of insulating material having a density within the range of from about 0.5 pcf to about 5.0 pcf.

20. The insulation product of claim 19 in which the additional layer of insulating material has an NRC rating within the range of from about 0.3 to about 0.8.

* * * * *